(No Model.)
G. W. ARMSTRONG.
FRUIT PICKER.
No. 515,852. Patented Mar. 6, 1894.
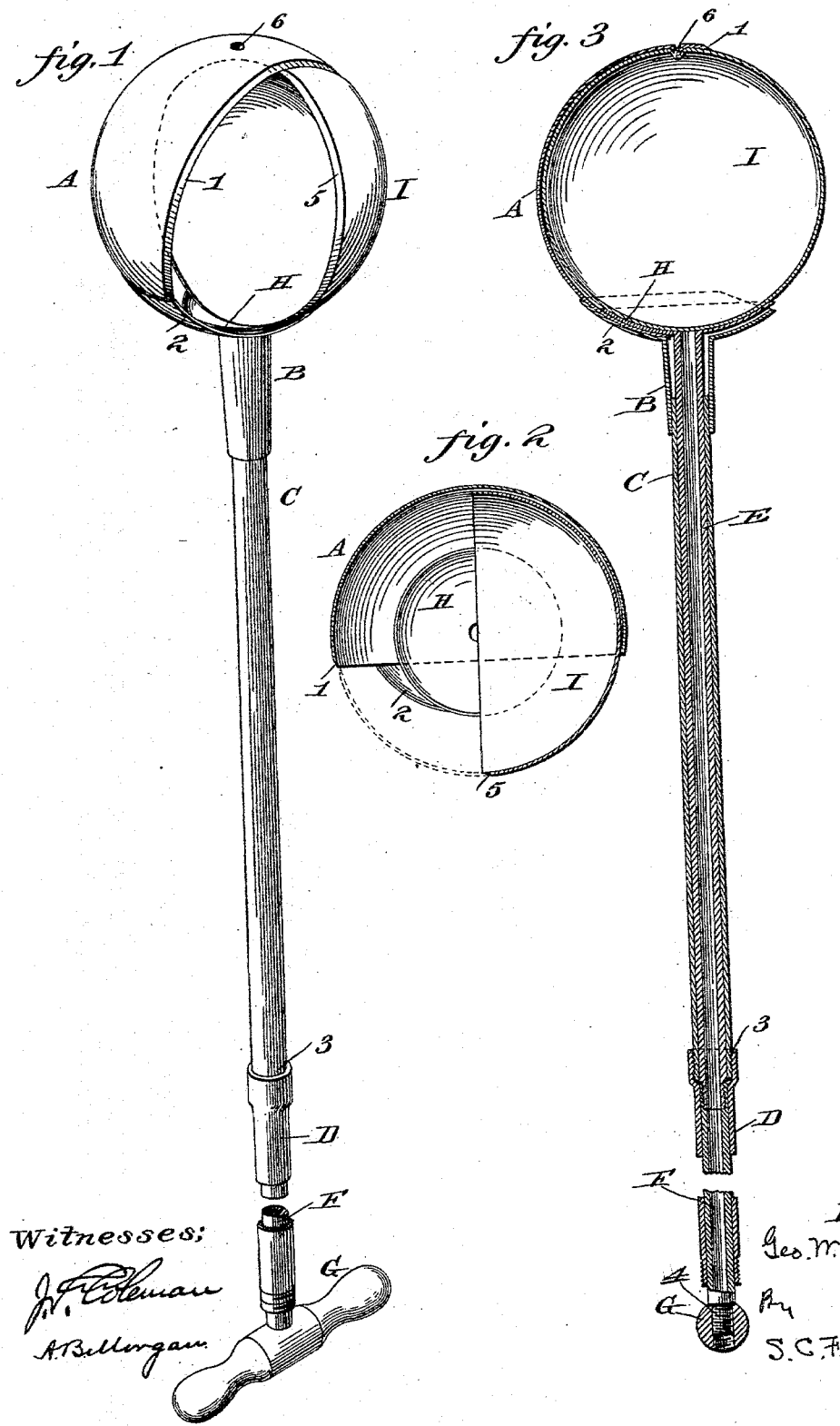

UNITED STATES PATENT OFFICE.

GEORGE W. ARMSTRONG, OF AVINGER, TEXAS.

FRUIT-PICKER.

SPECIFICATION forming part of Letters Patent No. 515,852, dated March 6, 1894.

Application filed November 2, 1893. Serial No. 489,795. (No model.)

*To all whom it may concern:*

Be it known that I, GEORGE W. ARMSTRONG, a citizen of the United States, residing at Avinger, in the county of Cass and State of Texas, have invented certain new and useful Improvements in Fruit-Pickers; and I do hereby declare the following to be a full, clear, and exact description of the invention, such as will enable others skilled in the art to which it appertains to make and use the same.

My invention relates to improvements in fruit-pickers, and has for its object to provide a picker especially adapted for picking small fruit requiring care in handling.

A further object is to construct a picker that shall be cheap, efficient and durable; and which may be expeditiously handled and conveniently operated.

The invention will first be described in connection with the accompanying drawings, and then pointed out in the claims.

In the drawings—Figure 1 is a perspective view of a picker embodying my invention, in its open position. Fig. 2 is a horizontal section through the head of the picker, in its open position. Fig. 3 is a longitudinal section through the center of the picker.

Referring to the drawings, A is a stationary jaw made in the form of a truncated hollow sphere and having a knife edge 1, this jaw being secured by soldering or otherwise, to a flared top, 2, of a shank B which is fixed on the upper end of a tubular staff or handle, C, screw-threaded at its lower end, 3, for the attachment of an extension piece, D, if necessary, in order to lengthen the staff. Within the tubular handle is a rotatable operating-shaft E, also screw-threaded at its lower end for the attachment of an extension shaft, F, the operating-shaft and its extension being preferably tubular in order to lighten the weight of the picker. A handle G is screwed onto the threaded end of the operating shaft, or onto the lower threaded end, 4, of the extension-shaft, F, in case the latter is used.

It is to be observed that the screw-threads on the operating-shaft and extension-shaft are left-handed, in order that the said shafts may be turned by the handle G without becoming unscrewed from each other, or without the handles becoming loose.

The top end of the operating-shaft projects through the shank B and is provided with a dish shaped disk H to which is attached a movable jaw I, also in the form of a truncated hollow sphere, or approximately a hollow hemisphere. This movable jaw is adapted to rotate within the fixed jaw, its diameter being smaller than the diameter of the fixed jaw. It will be noticed that the movable jaw I is provided with a knife edge 5 which is arranged to contact with the knife-edge 1 of the stationary jaw.

If desired a pivot 6 may be formed in the top of the stationary jaw and projecting downward into the movable jaw in order to support the latter at its upper end.

The operation of my apparatus is as follows: The picker is elevated and moved so as to allow the fruit to enter the hollow portion of the stationary jaw; the operating shaft or handle is then turned by the operator standing on the ground until the movable jaw is turned entirely around with its knife-edge in contact with the knife-edge of the stationary jaw, whereupon the stem of the fruit is severed and the picker may be lowered to the ground—the handle turned so as to open the picker head and the fruit emptied, and the operation in like manner repeated. When it is desired to pick fruit beyond the reach of a single staff, the extension-staff may be screwed on to the lower end of the staff and the extension-shaft is attached to the lower end of the operating-shaft, thus lengthening the picker and enabling the operator to reach the fruit on the topmost branches of the trees.

It will be understood from the foregoing description taken in conjunction with the drawings that my improved device is very simple, cheap and effective in operation, and that by reason of the peculiar arrangement of the staff or handle and the operating shaft, the jaws A, and I, may be conveniently directed to the fruit to be gathered and may be positively actuated without liability of interference no matter how dense the foliage of the tree.

Having thus fully described my invention, what I claim, and desire to secure by Letters Patent, is—

1. The fruit picker substantially as described, comprising a tubular handle, or staff, a jaw fixedly connected to one end of said handle or staff, a jaw movable with respect to said fixed jaw, and a rotatable operating shaft extending through the handle or staff and fixedly connected to the movable jaw, for the purpose set forth.

2. In a fruit picker, the combination with a jaw A, of hemispherical form, and a tubular handle or staff fixedly connected to said jaw; of a hemispherical jaw I, of less size than jaw A, and adapted to move with respect to the same, and a rotatable operating shaft extending through the tubular shaft and fixedly connected to the jaw I, substantially as and for the purpose set forth.

3. The herein described fruit picker consisting of the following instrumentalities in combination, viz; the hemispherical jaw A, having a cutting edge, a tubular handle or staff fixedly connected to said jaw at one end and having screw threads at its opposite end, the hemispherical jaw I, of a less size than jaw A, and movable with respect thereto and also having a cutting edge, a rotatable operating shaft extending through the handle and fixedly connected at one end to the jaw I, and having screw threads at its opposite end, an extension handle D, having threads to engage those of the handle proper and an extension operating shaft having threads to engage those of the shaft proper and also having a handle or hand grasp G, all substantially as and for the purpose set forth.

In testimony whereof I affix my signature in presence of two witnesses.

GEORGE W. ARMSTRONG.

Witnesses:
J. R. McCain,
S. L. Lewis.